United States Patent
Hsu et al.

(10) Patent No.: US 11,163,894 B2
(45) Date of Patent: *Nov. 2, 2021

(54) DISTRIBUTED DATA METHOD FOR ENCRYPTING DATA

(71) Applicant: VMware, Inc., Palo Alto, CA (US)

(72) Inventors: Windsor Hsu, San Jose, CA (US); Surendar Chandra, Sunnyvale, CA (US); R. Hugo Patterson, Los Altos, CA (US)

(73) Assignee: VMware, Inc., Palo Alto, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 16/747,495

(22) Filed: Jan. 20, 2020

(65) Prior Publication Data

US 2020/0151344 A1 May 14, 2020

Related U.S. Application Data

(63) Continuation of application No. 15/444,090, filed on Feb. 27, 2017, now Pat. No. 10,540,504, which is a
(Continued)

(51) Int. Cl.
*G06F 21/60* (2013.01)
*G06F 16/215* (2019.01)
(Continued)

(52) U.S. Cl.
CPC ........ *G06F 21/602* (2013.01); *G06F 11/1076* (2013.01); *G06F 11/1441* (2013.01);
(Continued)

(58) Field of Classification Search
CPC ............... G06F 21/602; G06F 11/1076; G06F 11/1402; G06F 11/1448
See application file for complete search history.

(56) References Cited

U.S. PATENT DOCUMENTS 5,268,962 A  12/1993 Abadi
6,704,730 B2  3/2004 Moulton et al.
(Continued)

OTHER PUBLICATIONS

Hsu, U.S. Appl. No. 15/444,090, filed Feb. 27, 2017, Office Action, dated Aug. 6, 2018.
(Continued)

*Primary Examiner* — Ryan Bertram
(74) *Attorney, Agent, or Firm* — Fish & Richardson P.C.

(57) ABSTRACT

Techniques for performing data encryption on data to be stored within a storage system are provided. A client application executing on a host machine may generate a data storage write request to write data to a storage system. A host-side module, executing on the host machine receives the write request. The host-side module is configured to generate one or more fingerprints for the data corresponding to the write request, where the one or more fingerprints are unique identifiers used to identify data blocks that make up the data. The host-side module generates encrypted data by encrypting the data blocks using an encryption technique. The encrypted data is then sent to a storage node within the storage system. Deduplication may be performed on the encrypted data using the one or more generated fingerprints.

30 Claims, 8 Drawing Sheets

Related U.S. Application Data continuation-in-part of application No. 14/710,541, filed on May 12, 2015, now Pat. No. 10,180,948.

(51) Int. Cl.
    *G06F 11/10* (2006.01)
    *G06F 16/182* (2019.01)
    *G06F 21/62* (2013.01)
    *G06F 11/14* (2006.01)
    *G06F 16/11* (2019.01)

(52) U.S. Cl.
CPC .......... *G06F 11/1453* (2013.01); *G06F 16/11* (2019.01); *G06F 16/1827* (2019.01); *G06F 16/215* (2019.01); *G06F 21/6209* (2013.01); *G06F 2211/1009* (2013.01); *G06F 2211/1028* (2013.01); *G06F 2211/1088* (2013.01)

(56) References Cited

U.S. PATENT DOCUMENTS

| | | | |
|---|---|---|---|
| 7,373,464 | B2 | 5/2008 | Zhu et al. |
| 7,434,015 | B2 | 10/2008 | Zhu et al. |
| 7,596,570 | B1 | 9/2009 | Emigh |
| 8,285,918 | B2 | 10/2012 | Maheshwari |
| 8,386,838 | B1 | 2/2013 | Byan |
| 8,601,473 | B1 | 12/2013 | Aron et al. |
| 9,081,771 | B1 | 7/2015 | Faibish et al. |
| 9,152,814 | B1 | 10/2015 | Natanzon |
| 9,842,114 | B2 | 12/2017 | Kenchammana-Hosekote et al. |
| 10,073,878 | B1 * | 9/2018 | Han .................. G06F 3/0688 |
| 2005/0013441 | A1 | 1/2005 | Klein |
| 2005/0177770 | A1 | 8/2005 | Coatney et al. |
| 2006/0161810 | A1 | 7/2006 | Bao |
| 2006/0218360 | A1 | 9/2006 | Burkey |
| 2009/0113420 | A1 | 4/2009 | Pawlowksi |
| 2009/0204769 | A1 | 8/2009 | Heil et al. |
| 2009/0204846 | A1 | 8/2009 | Baloun et al. |
| 2009/0214044 | A1 | 8/2009 | Kinoshita |
| 2009/0292861 | A1 | 11/2009 | Kanevsky et al. |
| 2010/0106933 | A1 | 4/2010 | Kamila et al. |
| 2012/0204024 | A1 | 8/2012 | Augenstein |
| 2013/0067213 | A1 | 3/2013 | Liu |
| 2014/0032925 | A1 | 1/2014 | Panchbudhe et al. |
| 2014/0047263 | A1 | 2/2014 | Coatney et al. |
| 2014/0208024 | A1 | 7/2014 | Simionescu et al. |
| 2014/0310332 | A1 | 10/2014 | Huang et al. |
| 2014/0380307 | A1 | 12/2014 | Zhu et al. |
| 2016/0154963 | A1 | 6/2016 | Kumar |
| 2016/0291891 | A1 | 10/2016 | Cheriton |
| 2017/0031830 | A1 | 2/2017 | BK |
| 2017/0091183 | A1 | 3/2017 | Kenchammana-Hosekote |
| 2017/0169233 | A1 | 6/2017 | Hsu et al. |
| 2017/0250859 | A1 | 8/2017 | Gheorghe |
| 2018/0034787 | A1 | 2/2018 | Kamaraju |

OTHER PUBLICATIONS

Hsu, U.S. Appl. No. 15/444,090, filed Feb. 27, 2017, Office Action, dated Mar. 1, 2019.

Hsu, U.S. Appl. No. 15/444,090, filed Feb. 27, 2017, Notice of Allowance, dated Sep. 16, 2019.

Hsu, U.S. Appl. No. 15/444,090, filed Feb. 27, 2017, Final Office Action, dated Dec. 19, 2018.

Hsu, U.S. Appl. No. 15/444,090, filed Feb. 27, 2017, Final Office Action, dated Jul. 1, 2019.

Author unknown, "Nutanix Complete Cluster", Nutanix online whitepaper downloaded Jun. 10, 2015 from http://go.nutanix.com/rs/nutanix/images/WPNutanixComplete_Cluster_Technical_Whitepaper.pd!, 15 pages.

Author unknown, "The Seagate Kinetic Open Storage Vision", web page description downloaded Jun. 10, 2015 from http://www.seagate.com/tech-insights/kinetic-vision-how-seagate-new-developer-tools-meets-the-needs-of-cloudstorage-platforms-master-ti/, 9 pages.

Author unknown, "What's New: VMware Virtual SAN 6.0", VMware Storage Business Unit Documentation 7 v1 .0, Feb. 2015, VMware online whitepaper downloaded Jun. 10, 2015 from • http://www.vmware.com/Ii les/pdf/products/vsanNMware_Virtual_SANWhats_New.pdf, 16 pages.

Byan et al., "Mercury: Host-side Flash Caching for the Data Center", Apr. 20, 2012 , 85 pages.

DellEMC.com, "EMC lsilon OneFS Operating System, Powering the lsilon Scale-Out Storage Platform," Dec. 2013, retrieved from URL http:/, www.emc.com/collateral/hardware/white-papers/h8202-isilon-onefs-wp.pdf, 16 pages.

Denneman "Understanding the 1/0 Path of a Storage Acceleration Solution", PernixData online whitepaper downloaded Jun. 10, 2015 from http://pernixdata.com/sites/default/Iiles/resources/Understanding_1O_Path_of_Storage_Acceleration_Whitepaper.pdf, 5 pages.

Dewaikar "Symantec NetBackup PureDisk Optimizing Backups with Deduplication for Remote 8 Offices, Data Center and Virtual Machines", 2009, Symantec online whitepaper downloaded Jun. 10, 2015 from • http://eval.symantec.com/mktginfo/enterprise/white_papers/b-symantec_netbackup_puredisk_WP.en-us.pdf.

Eisler et al., "Data ONTAP GX: A Scalable Storage Cluste", FAST '07: 5th USENIX Conference on File and Storage Technologies, http:// static.usen ix.org/event/fasto7/techi/fu Il_papers/eisler/eisler.pdf.

Lee et al., "Petal: Distributed Virtual Disks", Proceedings of the 7th International Conference on Architectural SIGOPS Oper. Syst.. Rev. , Sep. 1996, 84-92.

Miranda et al., "Reliable and Randomized Data Distribution Strategies for Large Scale Storage Systems", HIPC '11 Proceedings of the 201118th International Conference on High Performance Computing, pp. 1-10, IEEE • Computer Society, 2011, downloaded Jun. 13, 2015 from http://www.ssrc.ucsc.edu/Papers/miranda-hipc11.pdf, 10 pages.

Oehme et al., "IBM Scale out File Services: Reinventing Network-Attached Storage", Jul./Sep. 2008, http:// www-935.ibm.com/services/us/its/pdf/sofs-am-journal-final-070108.pdf, 10 pages.

Patterson et al., "A Case for Redundant Arrays of Inexpensive Disks (RAID)", Computer Science Division, University of California, Jun. 1988, 109-16.

Schindler et al., "From Server-Side to Host-Side: Flash Memory for Enterprise Storage" NepApp, May 9, 2012, 31 pages.

Thekkath et al., "Frangipani: A Scalable Distributed File System", SIGOPS Oper. Sys!. Rev. 31, 5 (Oct. 1997), 224-237, downloaded Jun. 9, 2015 from http:i/pdos.csail.mit.edu/6.824-2004/papers/thekkathfrangipani.pdf, 14 pages.

Welch, et al., "Scalable Performance of the Panasas Parallel File System" 6th USENIX Conference on File and Storage Technologies (FAST '08), San Jose, California, Feb. 26-29, 2008, Jun. 23, 2011 Whitepaper version downloaded May 2015 from http://www.panasas.com/sites/default/files/docs/Panasas_Scalable_Storage_Arch_WP 1066.pdf, 22 pages.

European Patent Office, "Search Report" in application No. 18158639.7-1213, dated Oct. 5, 2018, 15 pages.

European Patent Office, "Search Report" in application No. 18158639.7-1213, dated Jun. 15, 2018, 14 pages.

European Claims in application No. 18158639.7-1213, dated Oct. 2018, 4 pages.

European Claims in application No. 18158639.7-1213, dated Jun. 2018, 4 pages.

\* cited by examiner

DISTRIBUTED DATA METHOD FOR ENCRYPTING DATA

CROSS-REFERENCE TO RELATED APPLICATIONS; BENEFIT CLAIM

This application is a Continuation of U.S. patent application Ser. No. 15/444,090, filed Feb. 27, 2017; which is a Continuation-in-part of U.S. patent application Ser. No. 14/710,541, filed May 12, 2015, now U.S. Pat. No. 10,180,948 issued Jan. 15, 2019, the entire contents of which is hereby incorporated by reference for all purposes as if fully set forth herein.

FIELD OF THE INVENTION

The present invention relates to encrypting data within a distributed storage system.

BACKGROUND

Industries such as finance, healthcare, and retail sectors generally maintain large amounts of data. Due to the volume of data maintained in these industries, electronic file systems used are typically distributed file systems that store data on multiple storage arrays located on remote storage systems separate from the application servers. Distributed electronic file systems used to maintain the data typically employ data encryption in order to protect sensitive information from unauthorized users and to comply with various regulatory requirements.

Current encryption methods used to encrypt data on electronic file systems include: application level encryption, controller-managed encryption, and self-encrypting storage drives. Application level encryption is the process of encrypting data at the application level or virtual machine level before writing the data to the storage system. One benefit to encrypting at the application level is that the data is encrypted before it is sent via the network to the storage devices. This prevents unauthorized access of data while it is sent from the application server to the storage device via the network. However, storing application level encrypted data requires a large amount of storage space because techniques such as compression and deduplication are difficult to apply. Encryption generally randomizes the data so that compression becomes ineffective on the encrypted data. Encryption also makes it less likely that two identical copies of a unit of data are identical in the encrypted form thus making deduplication of the encrypted data difficult as well.

Self-encrypting storage drives are storage devices that have the ability to encrypt data when it is received. One advantage of using self-encrypting drives is that the storage controller can reduce the size of the data through compression and deduplication before storing the data in the self-encrypting drives. However, one of the major disadvantages to using self-encrypting drives is that the data sent over the network from the application server to the self-encrypting drive is not encrypted and may be susceptible to unauthorized access while travelling over the network. Additionally, users of self-encrypting drives are limited to the encryption capability of the drive itself. If a user wishes to update or change their encryption strategy, then the user may be forced to buy new hardware that supports the changed strategy.

Controller-managed encryption is encryption that is performed by the storage controller. For example, a write request to write data is sent from the application server to the storage controller. The storage controller then determines which storage device to store the data and encrypts the data before sending it to the appropriate storage device. This technique allows users the flexibility to change and/or upgrade storage devices without worrying about the encryption limits of the storage devices, as was the case with the self-encrypting drives. However, a security risk still exists when receiving data from the application servers because the data sent from the application servers to the storage controller is not encrypted. Therefore, an efficient approach to encrypting data that protects the data during transit between application servers and storage systems and that may benefit from compression and deduplication techniques is desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing data encryption and decryption on data to be stored within a storage system. According to one embodiment, a client application executing on a host machine may generate a data storage write request to write data to a storage system. A host-side module, executing on the host machine receives the write request. The host-side module is configured to generate one or more fingerprints for the data corresponding to the write request, where the one or more fingerprints are unique identifiers used to identify data blocks that make up the data. Upon generating the one or more fingerprints corresponding to the data blocks, the host-side module generates encrypted data by encrypting the data blocks using an encryption technique. The encrypted data is then sent to a storage node within the storage system. Deduplication may be performed on the encrypted data using the one or more generated fingerprints.

Distributed Virtual Array

Figure 1:
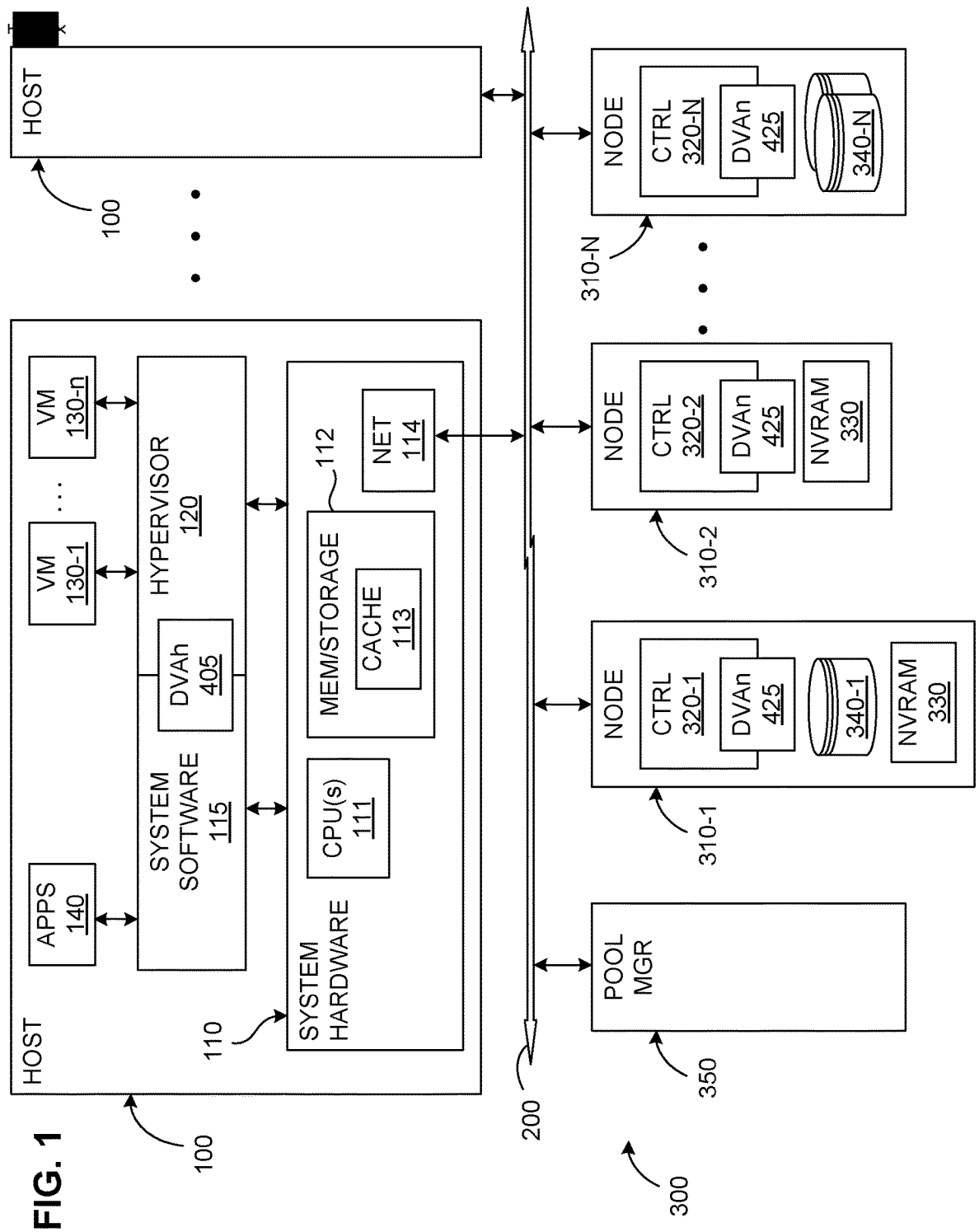
FIG. 1 illustrates the main components of a Distributed Virtual Array (DVA) system.

FIG. 1 shows a general embodiment of the invention and illustrates the relationship between two main physical "sides" of the DVA: any number (including one) of hosts 100, for example, servers, and a storage Pool 300, which includes storage nodes 310-1, 310-2, . . . , 310-N (collectively, "310"), which from the perspective of the hosts, may form a single yet distributed storage system. Entities within the hosts 100 write data that is first stored in non-volatile memory (shown as NVRAM 330) and ultimately stored in persistent storage devices 340-1, . . . , 340-N (collectively, "340") located in the nodes.

The reading and writing entities may be of any type, including virtual machines 130 (shown separately as "VM"s 130-1, . . . , 130-n) or more general, non-virtualized processes such as user-level applications 140. Software and hardware entities that need to read and/or write data are referred to here as "clients".

Each host includes system hardware 110, including one or more processors (CPUs) 111, and some device(s) 112 for non-persistent, volatile and/or persistent, non-volatile, non-transitory storage of data and/or code that may execute on the CPU(s). Traditionally, there is a relatively clear technical distinction between "memory" and "storage", since the former has typically comprised fast, volatile, solid-state devices, whereas the latter have generally comprised slower, non-volatile, mechanical or opto-mechanical devices. With the wide-spread use of modern technologies for bulk, persistent storage, however, this distinction is becoming increasingly less clear. For example, many modern servers use various solid-state storage devices (SSDs) such as "server flash" to increase throughput and speed, which is commonly measured in terms of IOPS (Input/Output Operations Per Second), especially for non-contiguous storage locations. Emerging technologies such as phase-change memory (PRAM) are further blurring the distinction. No specific type of host-side storage or memory technology is required to implement the embodiments described here, and it is not necessary for every host to employ the same storage technology.

The hardware 110 will include other conventional mechanisms such as a network connection device 114 for transfer of data between the various components of the system over one or more network(s) 200, which may be any known public or proprietary local or wide-area network such as the Internet, an internal enterprise network, etc. The only requirement is that, whatever network(s) is/are used, all clients are able to access the storage nodes (see below) they need to access. "The" network 200 is therefore to be read as the collection of whichever networks are implemented, along with any necessary switching or other communications devices if data needs to pass between different networks.

Each host will also include conventional system software 115 such as, depending on the implementation, an operating system (OS), device drivers, etc. In the illustrated configuration, one of the hosts 100 is shown as supporting a virtualization platform, which will typically include some form of hypervisor 120 or similar interface layer between the system hardware 110 and (in the illustrated embodiment) at least one virtual machine (VM) 130-1, . . . , 130-n. As is well known, VM is a software abstraction of an actual physical computer system.

The VMs are shown in FIG. 1 within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc., run directly on "bare metal", that is, directly on the system hardware 110, with no need for interaction with a host OS. In other virtualization platforms, the hypervisor may run on or at the same level as the host OS, which supports and performs some operations upon calls from the hypervisor. The various embodiments of the invention described here are not dependent on any particular virtualization architecture, whether for the VMs, the hypervisor(s) or other virtualization layers. Indeed, VMs are not presupposed at all; rather, all that is assumed is some system software layer that processes data storage read/write requests from software and hardware entities ("clients"). A "host" is thus any platform on which processes (of which VMs are a special case) run that may wish to write data to and/or read data from the distributed storage arrangement described below.

Although the various storage nodes 310 in the pool 300 are shown as distinct units and may be different physical servers, they may be considered to lie within a single logical boundary for purposes of addressing. The logical, conceptual boundary of the addressable storage pool may, however, also include storage components and processes that extend beyond the illustrated set of physical storage nodes 310-1, 310-2, . . . , 310-N.

Depending on the desired DVA features, a Pool Manager 350 may also be included to handle some distribution and control functions for the nodes 310, to maintain administrative and other data common to the nodes 310, etc. Such a Pool Manager may run within one or more of the storage nodes, within one or more of the hosts, or in a separate computing system attached to the same network. Although they may also be implemented as independent entities, the Pool Manager may also include other managerial components, such as for managing a file name space for files (such as virtual disks) stored within the pool, for cluster management, and for other node-management functions.

Two of the many currently available examples of possible choices to implement a storage node could be a Xyratex chassis with multiple disk controllers, or a single-disk "FAWN" (Fast Array of Wimpy Nodes), which is a low-power server architecture for intensive input/output tasks. More generally, the nodes can be implemented using any form of computer that communicates with at least one disk over any form of bus or network connection. Indeed, a node could itself even be an entity that writes data to the storage pool.

Each node contains one or more storage controllers 320-1, 320-2, . . . , 320-N (collectively, 320) each of which comprises conventional processing circuitry to control one or more disks, flash or other SSD devices or other devices comprising the persistent storage devices 340 (which comprises more than one physical device). The controller also contains the circuitry necessary to connect to the network 200. In some embodiments, the controller may be integrated with the storage device in single composite module. As with the host 100, the various software components used within the nodes of the storage pool 300 will be loaded and/or stored in any conventional method so as to be executable on the processor(s) on each hardware platform within the pool; these media and processor(s) are not illustrated separately in the figures for the sake of simplicity—skilled programmers will of course know these will be present. So far, the system components described are also found in many prior art systems.

In the preferred embodiment, at least one of the controllers 320 also includes, or is able to access, some non-volatile memory 330 (NVRAM—FIG. 2) to receive and persistently store newly written data with very low latency. In some systems, the NVRAM may be on a special card in a PCIe slot. In some implementations, the controller may have a battery backup; on power failure, the controller will then have enough time to copy a portion of system memory to a flash drive. In this case, the NVRAM 330 need not be a separate physical component but may instead a logical portion of the general purpose RAM that will be within the controller for other, standard purposes. In some systems, the NVRAM may just be a low-latency SSD. Not all implementations of embodiments of the invention require nodes to have both disks and NVRAM; rather, any given node may be configured to have or at least be able to access only one of these two types of persistent storage devices. Thus, as FIG. 1 illustrates, it is possible to implement the system such that one or more nodes may have both persistent storage device(s) and non-volatile memory (node 310-1, for example), while one or more other nodes may not include the persistent storage device (node 310-2, for example), and still other node(s) may not have a non-volatile memory component 330 at all. As FIG. 1 also illustrates with node 310-N, it is possible to one or more nodes to have more than one persistent storage device (340-N). Moreover, in some embodiments, the NVRAM may be in a host.

In the preferred embodiment, the host is able to write data over the network specifically to the NVRAM in a storage node or host, distinct from writing to a persistent storage device, and may also give commands to remove data from said NVRAM. This in contrast to the configuration in traditional storage systems in which the NVRAM is a transparent buffer for data on its way to a persistent storage device.

As mentioned above, two dominant storage philosophies fall near different ends of the trade-off spectrum: In hyperconverged systems, substantially the entire storage and computation burden is concentrated within interdependent hosts, whereas in other systems, most of the computational load is placed on the remote storage units themselves and the hosts do not depend directly on each other. Embodiments of the invention employ a different approach, in which the usually greater computational resources of hosts are used for many storage-related functions, but used in a way that does not require significant inter-host communication and coordination, and in which the main storage capability remains primarily in the remote nodes where any host can access it without going through another host.

To this end, the hosts and the nodes include respective DVA components—a DVAh 405 module at the system software level, and DVAn 425 in the nodes. As FIG. 1 illustrates by overlapping, the DVAh 405 may be implemented as part of the system software 115, as part of the controlling software (such as the hypervisor 120) of the virtualization platform, or with cooperating components in both. Options include configuring the DVAh component as a driver within the system software 115, or within the hypervisor 120, with call-outs as needed to the host operating system (system software). It would also be possible to configure the DVAh 405 component within a different user- or system-level process, or even within a "helper" VM. Regardless of the configuration of the DVAh and DVAn, they will generally be implemented as corresponding bodies of processor-executable code that is stored in non-transitory storage and loaded into memory for execution by the host CPU(s) 111.

Similarly, the DVAn 425 components in the nodes may also be implemented as software running on the respective storage controllers 320, or as software modules separate from but coordinating with the storage controllers, and will also be implemented as corresponding bodies of processor-executable code that stored in non-transitory storage and loaded into memory for execution by the processor(s) in the nodes 310.

In an embodiment, storage controller 320 manages data encryption by distributing encryption keys to the DVAh 405 located on hosts. In order to maintain security, encryption keys used by hosts may be rotated periodically. The storage controller 320 maintains an encryption table that contains multiple encryption keys that may be used by different hosts at different times for data encryption. In an embodiment the encryption table contains columns specifying an encryption key value and an encryption index value used to identify the encryption key value. When the storage controller 320 sends an encryption key value to the DVAh 405 on a particular host, the storage controller 320 sends the encryption key value along with the encryption index value. The encryption table may also include a column that specifies the encryption algorithm associated with the encryption key. By storing the encryption algorithm in the encryption table, the storage controller 320 may support different types of encryption algorithms and may allow changing the type of encryption algorithm used to encrypt data by simply sending the encryption key value, the encryption algorithm type, and the encryption index value to the DVAh 405. In an embodiment, one or more modules within the DVAh 405 are configured to manage encryption of data by receiving the encryption key value from the storage controller 320.

A cache 113 is preferably included in at least one host, preferably as part of the memory/storage component(s) 112. The cache may be implemented using any conventional, sufficiently fast technology, such as by using one or more Flash memory device(s), phase-change random access memory (PRAM), a portion of the main system memory, etc. The cache may also be implemented as a separately packaged, Solid-State Disk (SSD), a circuit card plugged into a bus within the server, as a module on the server motherboard, etc.

Figure 2:
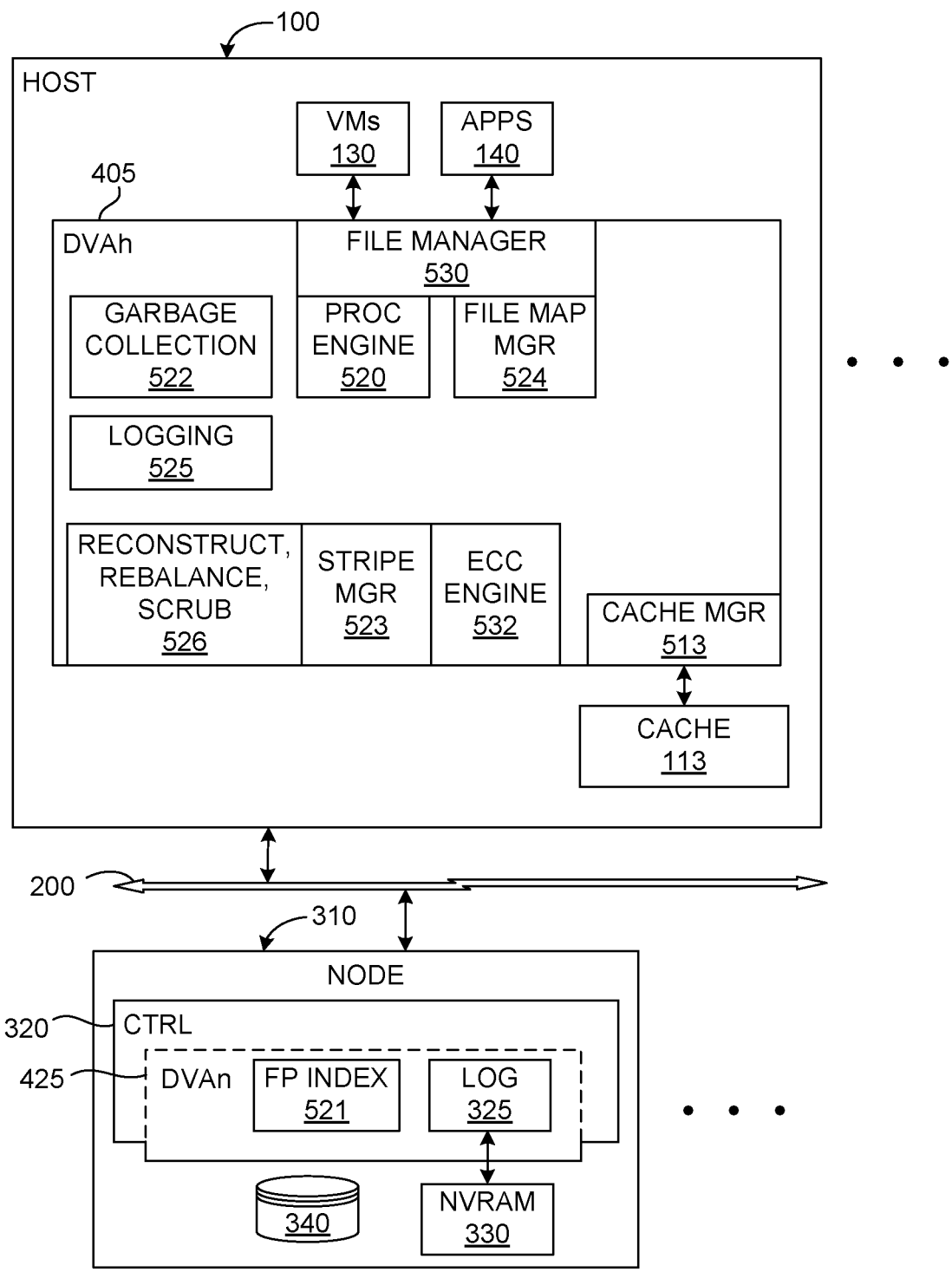
FIG. 2 shows some of the components of the DVA system in greater detail.

FIG. 2 is a simplified representation of the main system components shown in FIG. 1, but with more detail of various optional sub-components of the DVA modules. Although only one host and one node are shown, similar sub-components may be included in other hosts/nodes as well. Note that it will not be necessary for all hosts or nodes to include the same DVA sub-components as the one illustrated in FIG. 2; within any given host, any number (from one to all) of the illustrated sub-components may be included, in any desired combination, depending on the needs of any given implementation. The set of DVA sub-components shown in FIG. 2 is therefore for purposes of illustration and explanation only. Furthermore, although the various sub-components are shown as being separate in FIG. 2, this is for purposes of illustration and explanation only—any or all of them could be combined into unitary bodies of executable code.

The DVA sub-components and their functions perform any or all of various storage processing functions, including background storage management functions, data transformation functions, and/or other functions outlined below. Note that on traditional storage systems, these functions are typically performed within the storage controllers and not in the hosts. The DVAh sub-components preferentially include:

A cache manager 513, which handles reads and writes to the cache 113 using known techniques. In one embodiment, the cache comprises data blocks which have been fingerprinted such that it is possible to find blocks within the cache based on the fingerprint for the block.

A file manager component 530, which receives data from VMs (or other processes, virtualized or not) on the host and processes it to whichever format has been architected for storage in the pool 300. It also receives requests to read data and it retrieves data from the cache or pool, processes it to return it to its originally stored format, and returns the requested data. The file manager may invoke other components to help it cache, process, store, or retrieve data.

The file manager 530 may invoke a mapping module 524, which updates maps from a file offset to a reference to the corresponding data item stored in the pool 300. In some embodiments, that data item reference comprises a fingerprint of a block that includes the data item. In some embodiments, the host computes the fingerprint. In some embodiments, the data item reference comprises a locator for the data item. To satisfy a read request for some offset in a file, the file manager invokes the mapping module 524 to obtain the reference to the data item stored for that offset in the file. It may then use that reference to retrieve the data item from the cache, or, if the data item is not there, it may retrieve the data item from the pool.

As is well known, the storage system of a virtual machine is also virtualized. Processes running on a VM therefore address what they "think" is physical storage, but in fact is a virtual address in a "virtual disk" (vDisk), which then undergoes one or more levels of address redirection using corresponding address maps, leading ultimately to an address in physical space. In the context of a distributed storage system, VM reads and writes are ultimately mapped to the corresponding address in one (or more, for example, if data is mirrored) physical storage devices in the pool 300.

A Data Processing component—the processing engine 520—is preferably included to perform any or all of such known data-transforming functions as compression, encryption, checksums to ensure data integrity, packing of received data into erasure-coded stripes, for example, computing error-correcting code (ECC) values as part of RAID stripes, and/or computing fingerprints, that is, unique identifying information for received data blocks. One example of a possible fingerprinting technique is hashing, such as using any of the SHA methods (for example, SHA-1). Assuming that the chosen fingerprinting method is sufficiently collision resistant (that is, the probability of two different inputs yielding the same fingerprint output is sufficiently low), different data blocks having the same fingerprint may then be presumed to have the same content and therefore be duplicates.

In one embodiment, incoming data is fingerprinted and deduplicated by comparing the fingerprint of the incoming block to the fingerprints of the blocks stored in the cache 113, that is, within the host 100; this avoids the need to analyze and dedupe data stored in the pool 300. Not only does this arrangement allow these computationally intensive tasks to be performed in the usually more powerful host, but it also avoids most of the latency that would otherwise be experienced if the host would first have to retrieve the fingerprint from the more remote storage nodes 310.

A cache of fingerprinted blocks can also avoid the latency of fetching a data block from the pool in response to a read request. Two distinct files may each include a block with the same content and therefore the same fingerprint. The duplicate block may have been inserted in the cache 113 to satisfy a read or write request for one file and a subsequent read request for the duplicate block in another file may be satisfied from the cache without incurring the latency of fetching the block from the pool.

Fingerprinting or checksums may also be used to ensure data integrity and to detect incomplete writes. For example, fingerprints may be computed for buffered data. If there is any indication of possible host failure and incomplete write, the fingerprint of the present data may be compared with that of the buffered data—if the values are not the same, then the system will know the write was incomplete since the buffered data will not be identical to the data intended to be stored.

In a DVA that uses a log-structured filesystem, a garbage collection module 522 may be included to perform conventional garbage collection functions including, in some embodiments, identifying data to be copied forward and, in some embodiments, copying such data into new stripes.

In systems in which data is stored using stripes, a stripe manager 523 may be included. The stripe manager may use or include an ECC engine 532 to compute ECC values, which it adds to a stripe that it distributes across multiple storage nodes according to whatever mapping or allocation scheme that the designer chooses to implement.

A module 526 may also be included in the host to perform such functions as data reconstruction (for example, of missing RAID stripe elements from ECC information), data rebalancing, or data scrubbing to ensure data integrity, etc. This module, or one or more other host modules, may also perform such operations as prefetching data into the host flash cache; forming data clumps and deduping at that granularity and then repacking such clumps, handling host flash failures, updating vDisk maps on the host, etc.

The DVAn sub-components may include:

A fingerprint index 521 to map from fingerprints to data block locators or other identifiers. When a host stores fingerprinted data blocks in stripes and writes the stripes to the pool, it communicates the fingerprints and corresponding data block locators to the fingerprint index. When a host needs to read a fingerprinted block from the pool, it first requests the block locator from the index and then reads the block from the pool. The index 521 may be implemented in the host but is preferably implemented in the controller 320—because the size of the index is proportional to the storage capacity, it will generally be most efficient to bundle the memory for the index with its corresponding storage unit.

A log 325 that receives recently written data and other events from a logging module 525 on a host and stores that data in a non-volatile, low latency NVRAM module 330. The NVRAM module 330 is shown in FIG. 2 as being internal to the node 310, but this is just one implementation example. Other possibilities include putting the NVRAM module 330 within a different, dedicated node, or in any other location. By storing recently written data as a log or otherwise in the NVRAM, the write can be acknowledged as "safe" without incurring the latency of a write to a higher-latency device 340 such as a disk drive. By storing such data external to the host, including the log 325, if the host fails before storing it to a permanent location in one of the storage devices 340, another entity (such as one of storage nodes, one of the hosts that has not failed, or any other entity besides the host that originally received data) can read data from non-volatile device 330 and re-process the data to store it in one of the storage devices 340. This would not be possible if the only copy of the data were internal to the host in a cache 113 that was only accessible via the now-failed host.

One other advantage of including the NVRAM module 330 and exposing it to the hosts via an interface such as LOG 325 is that the host can make the data "safe" by writing it to NVRAM on a storage node allowing quick acknowledgement and then leverage its computing resources for further and possibly delayed storage processing, for example, after enough data is batched to form a stripe, etc. In some embodiments, some of the data written to the NVRAM may never be written to a persistent storage device without further storage processing by host. In some embodiments, the data may be written to multiple NVRAM devices to protect against the failure of one of the NVRAM devices or the controller it is connected to. The host may itself write to multiple NVRAM devices, or a controller may mirror a single host write to multiple NVRAM devices or to a plurality of other controllers and their NVRAM devices either in the same or a different node.

By way of example, assume that a VM wishes to write data to at least one virtualized disk vDisk or file. If the host on which the VM is a guest fails, a copy of the newly written data will survive in the log and NVRAM on some storage node. The Write data may also be buffered in the file manager or stored in the cache 113 of the VM host until there is enough data to complete some minimum storage unit, such as (for example, in RAID-like systems) a full stripe, before the data is written to the pool, possibly including to one or more storage nodes that did not hold log data for the write. New Write data can also be buffered on the VM host for even longer periods to give time for later overwrites of the same location in a vDisk, which eliminates the need to write out the overwritten data in a stripe. The host—either as part of the DVAh component, or some other host entity, such as in its operating system, may also compute at least one erasure coded block for the Write unit and then write it to a storage node.

If the operation is a READ, the desired data may be looked up in the cache 113. If the data is cached, it may be read from the cache and returned to the requesting process, such as a VM. If the data is not cached, it may be read directly from the storage node (using any intermediate address maps), and returned to the requesting process. The READ data may also be written to the cache.

By concentrating the management and computational burden in the host, the storage nodes can be kept relatively simple, and inexpensive, with no need for dedicated backplanes and fibre channel connections on the storage side; moreover, the entire storage side may communicate with the hosts directly via a standard network connection. Further, if the hosts communicate with the pool, but only infrequently with each other, then one host does not suffer from a noisy neighbor on another host. Finally, if the hosts include a large cache, then they will only infrequently have to contact even nodes in the pool, which further reduces the noisy neighbor problem. Hosts are empowered to serve data to the VMs and applications running within them and so are less susceptible to performance issues elsewhere in the system.

It should be noted that the various functions or processes disclosed herein may be described as data and/or instructions embodied in various non-volatile, computer-readable media, which may be provided as a computer program product to those wishing to implement embodiments of the DVA system.

Figure 3:
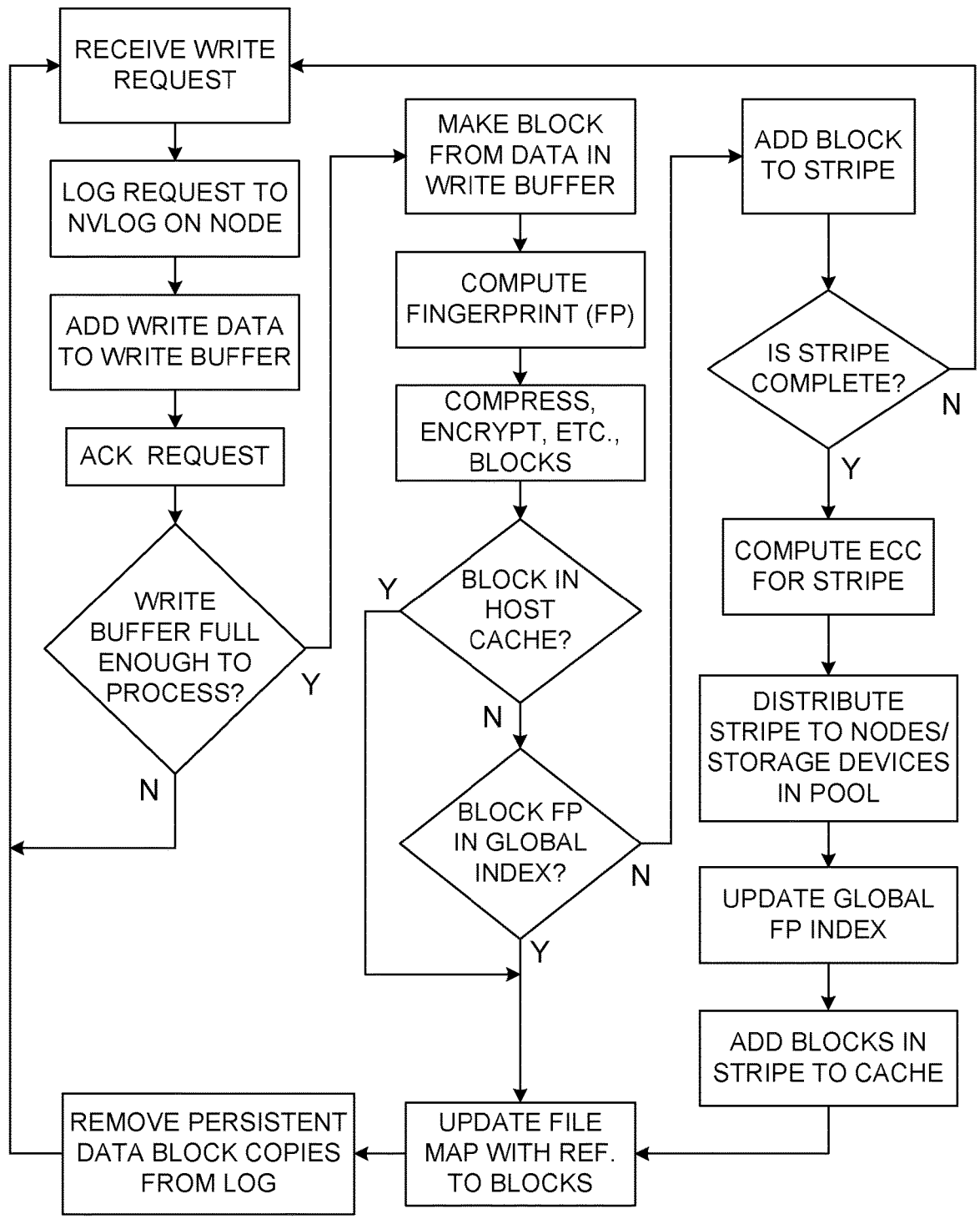
FIG. 3 is a flowchart of one example of workflow upon receipt of write requests.

FIG. 3 illustrates one implementation of processing write requests: When a write request is received, the request is logged to the NVRAM module 330 on a node. Logging the write includes an indication of the file and offset within the file being written. The write data itself is written to the write buffer and the request is acknowledged. If the write buffer is not full enough to trigger processing, for example, enough to form a block, then the processing will return to receive more write requests; otherwise, the written data may be formed into blocks and one or more fingerprints may be computed (depending on whether a single fingerprint is used for the entire data set or separate fingerprints are used per block). Either before, after, or at the same time as the fingerprint computation, the block data may also be processed, such as by compression, encryption, etc. If a given block is already in the host cache (which can be determined by fingerprint comparison), then a file map may be updated with references to the blocks and the processing may return to receive additional writes. If the block's fingerprint is not found in host cache or the global fingerprint index 521, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 521. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 525, may therefore communicate to the log 325 that it may truncate the data and remove it from the NVRAM. Note that the controller need not itself rewrite the data temporarily stored in NVRAM in a more permanent location. Finally, processing returns to receive additional writes. In other embodiments, the DVAh components compute a fingerprint and check for presence of that fingerprint in the host cache and/or global fingerprint index and, for the corresponding file and offset within the file, log to the remote NVRAM only a new reference to previously stored data instead of the data itself before acknowledging the write.

Figure 8:
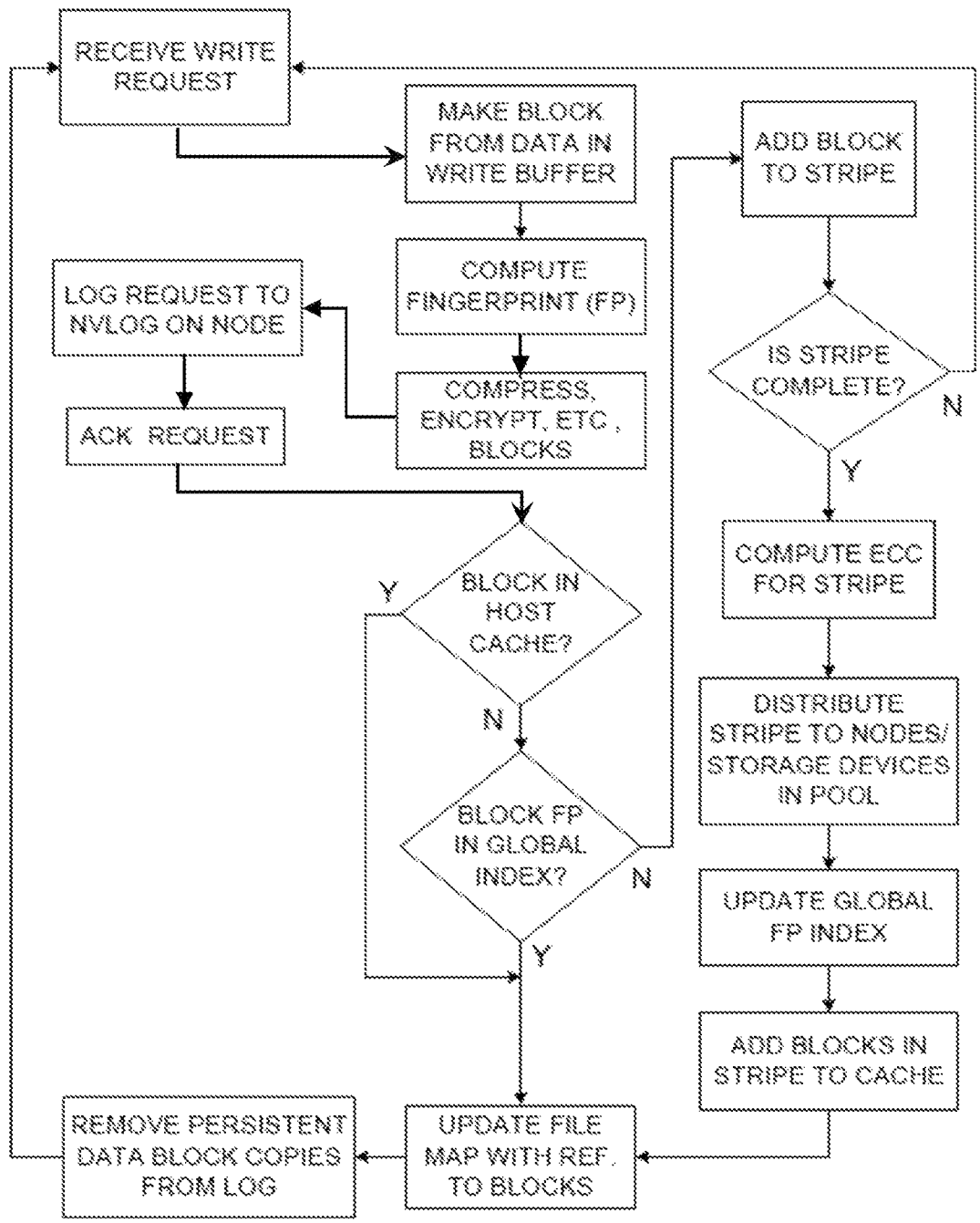
FIG. 8 is a flowchart of one example of workflow upon receipt of write requests.

FIG. 8 illustrates another implementation of processing write requests: When a write request is received, the request is logged to the NVRAM module 330 on a node and the request is acknowledged. Logging the write includes logging an indication of the file and offset within the file being written. If the write data does not completely cover a data block, the remaining parts of the block may be read from the host cache and/or the pool and merged with the write data to form a write block. The block may be processed, such as by compression, encryption, etc. before being logged to the NVRAM module 330. Fingerprints may also be computed on the unprocessed block to enable deduplication. If a given block is already in the host cache (which can be determined by fingerprint comparison), then a file map may be updated with references to the blocks and the processing may return to receive additional writes. If the block's fingerprint is not found in host cache or the global fingerprint index 521, the block is added to the stripe currently being constructed. If the stripe is not yet complete, the system may return to receive additional write requests. If the current stripe is complete, an ECC stripe element is computed for it and it can be distributed for storage. The fingerprints for the blocks in the stripe are then added to the global fingerprint index 521. The blocks can then also be added to the cache, after which, the file map is updated to reference the blocks as stored in the stripe. At this point the written data is safe in the face of a host failure so the temporary copy of the data in the NVRAM is no longer needed. The host, using, for example, the logging module 525, may therefore communicate to the log 325 that it may truncate the data and remove it from the NVRAM. Finally, processing returns to receive additional writes.

Figure 4:
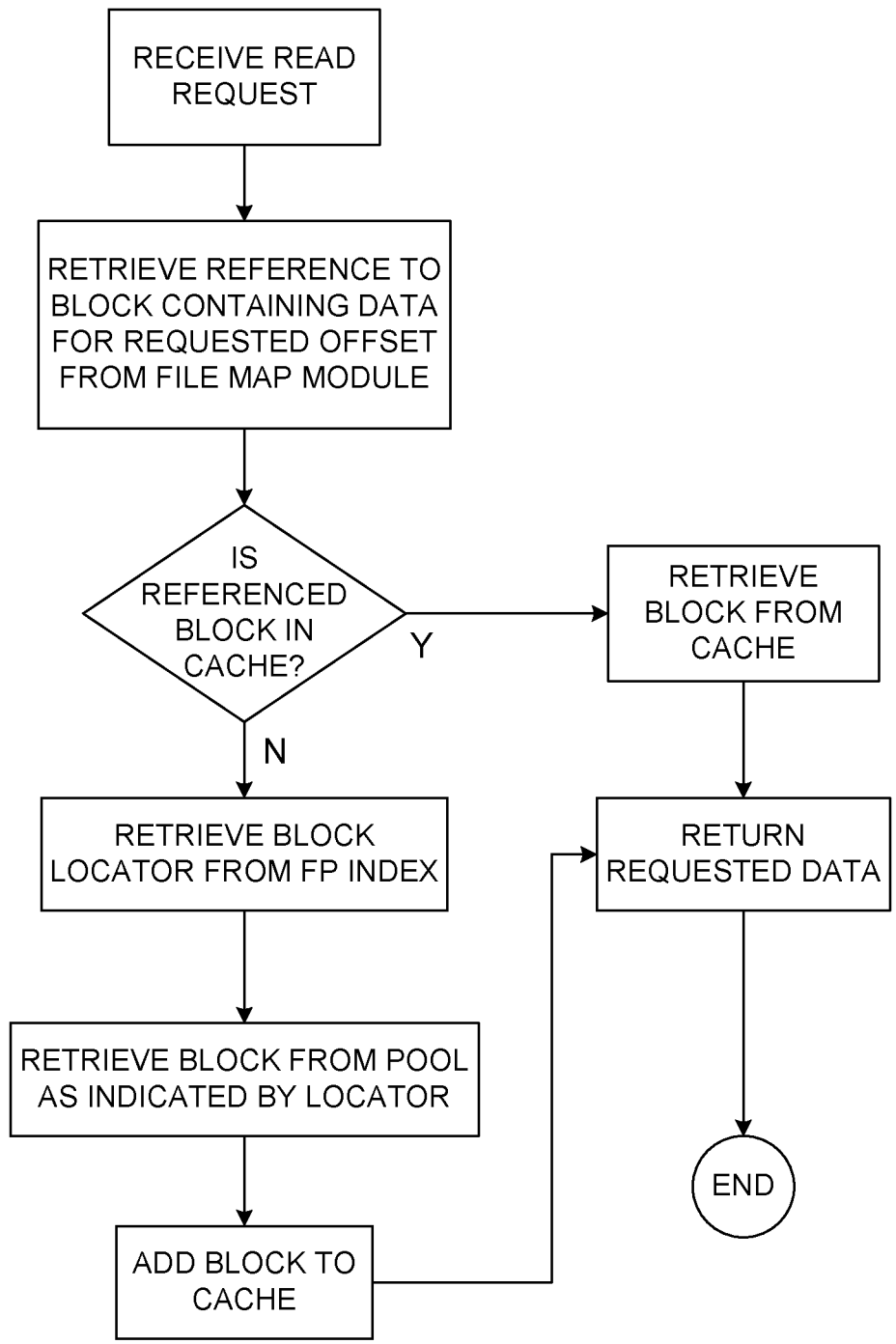
FIG. 4 is a flowchart of one example of workflow upon receipt of read requests.

FIG. 4 illustrates one implementation of processing read requests: A read request is received and the reference to the block containing the data is retrieved from file map module, which will provide the requested offset. If the referenced block is in the cache 113, it may be retrieved and the data can be returned to fulfill the read request. If the block is not in the cache, it must be retrieved from the pool. This can be achieved by retrieving the block locator from the fingerprint index. Once the block is retrieved, it may be added to the cache, and the requested data may be returned.

Data Encryption

Figure 5:
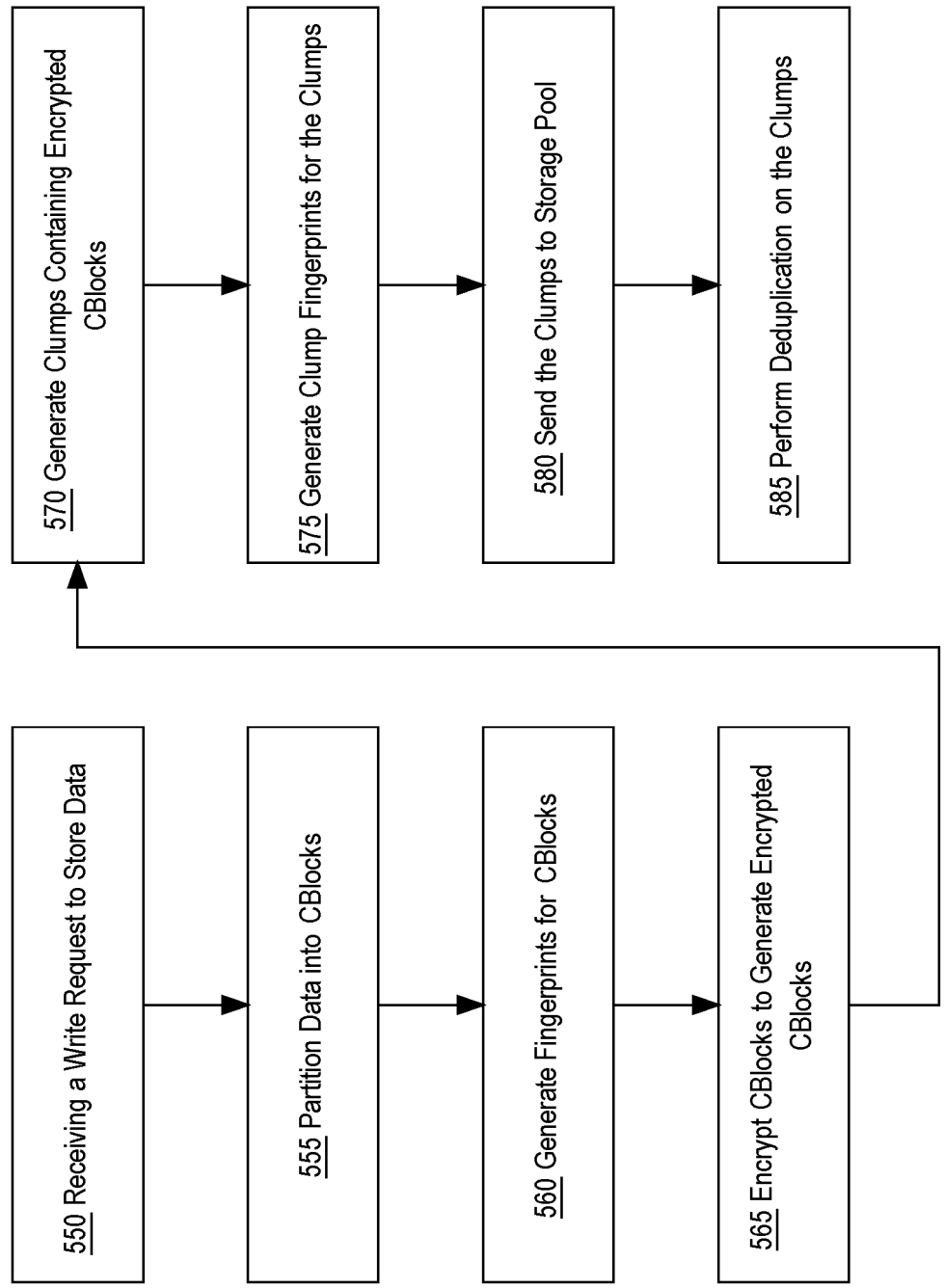
FIG. 5 is a flowchart of one example of workflow to encrypt data upon receiving a write request at the host-side module.

In an embodiment, a host-side module may be configured to encrypt data prior to storing the data in the NVRAM and/or the host cache and/or the storage pool 300. FIG. 5 depicts an example embodiment, of receiving a write request to store data and encrypting the data at the host before storing the data.

At step 550, the DVAh 405 receives a write request to store data in the storage pool 300. Referring to FIG. 2, the file manager component 530, within the DVAh 405, is configured to receive write requests from VM 130 or user-level applications 140. In an embodiment, VM 130 sends a write request to the DVAh 405 to write data to the storage pool 300. For example, VM 130 sends a request to write a 1 MB file to the storage pool 300 to the DVAh 405.

Figure 6:
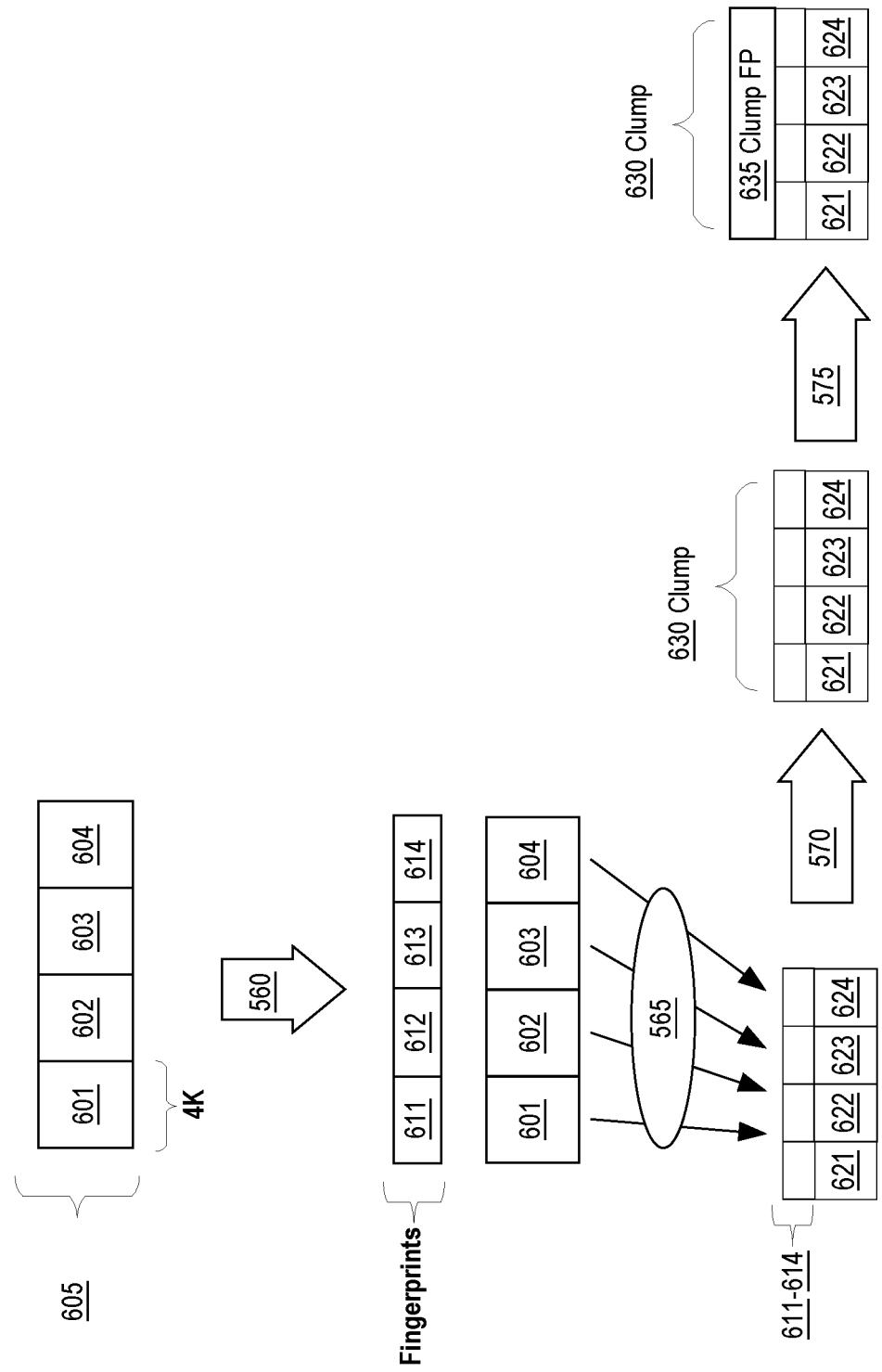
FIG. 6 is an example embodiment of encrypting and packaging data on a host-side module.

At step 555, the data received is partitioned into one or more data blocks. In an embodiment, the file manager component 530 partitions the received data into one or more data blocks called CBlocks. The file manager component 530 may be configured to generate 4096 byte (4K) sized CBlocks. For example, after receiving a request to write a 1 MB file, the file manager component 530 partitions the 1 MB file into multiple 4K-sized CBlocks. In other embodiments, the file manager component 530 may be configured to generate differently sized CBlocks. FIG. 6 depicts an example of the 1 MB file partitioned into CBlocks, compressed, and encrypted for storage. Data 605 represents data received from VM 130. The file manager 530 partitions data 605 into CBlocks 601-604. CBlocks 601-604 each depict a 4K-sized data block.

At step 560 unique fingerprints are generated for each of the CBlocks. In an embodiment, the processing engine 520 is configured to compute fingerprints for each CBlock to be stored in the storage pool 300. The processing engine 520 may implement different fingerprinting techniques, such as hashing, to generate unique fingerprint identifiers. For example in FIG. 6, the processing engine 520 may use SHA-1 to generate unique CBlock fingerprints, represented as CBlock fingerprints 611-614, for each of the CBlocks 601-604.

At step 565 each of the CBlocks are encrypted. In an embodiment, the processing engine 520 encrypts each of the CBlocks to generate encrypted CBlocks containing ciphertext based upon an encryption algorithm and an encryption key. For example, the processing engine 520 encrypts CBlocks 601-604 using encryption algorithm AES-XTS. The processing engine 520 may be configured to use different types of encryption algorithms based on the encryption key and algorithm provided by the storage controller 320.

In an embodiment the processing engine 520, prior to encryption, requests encryption information from the storage controller 320. Encryption information includes data necessary to perform encryption, such as the encryption algorithm, the encryption key, and an encryption index value used to identify the particular encryption key within the encryption table. In one example, encryption information may be requested upon startup of the host 100. Upon startup, the DVAh 405, which is running within the host 100, sends an encryption key request to the storage controller 320. The storage controller 320 then accesses the encryption table and sends the DVAh 405 the encryption algorithm, the encryption key, and the encryption index value. Additionally, the DVAh 405 may be configured to periodically request a new encryption key and algorithm from the storage controller 320. The storage controller 320 may also be configured to periodically send a new encryption key and algorithm to the DVAh 405 as part of a handshake procedure between the storage controller 320 and the host 100.

In an embodiment, prior to encrypting the CBlocks, the processing engine 520 is configured to compress each of the CBlocks using an available commercial compression algorithm. After compressing the CBlocks, the processing engine 520 encrypts the compressed CBlocks. For example, the processing engine 520 first compresses CBlocks 601-604 to generate compressed CBlocks 621-624 and then encrypts CBlocks 621-624.

In an embodiment, the processing engine 520 may be configured to store, with the particular encrypted CBlock, the encryption index value associated with the particular encryption key used to encrypt the particular encrypted CBlock. By doing so, the DVAh 405 and the storage controller 320 are not required to separately keep track of which encryption keys were used to encrypt data at specific times. Rather, the DVAh 405, when requesting a particular encryption key for decrypting the particular CBlock, may use the encryption index value stored with the encrypted CBlock as a lookup key. For example, the DVAh 405 encrypts CBlock 601 using a particular encryption key, which is associated to encryption index value "001", producing encrypted CBlock 621. The DVAh 405 then stores the encryption index value 001 with encrypted CBlock 621. For instance, index value 001 may be stored within CBlock 621 metadata. If at another time the DVAh 405 needs to decrypt CBlock 621, then DVAh 405 may retrieve the index value 001 from CBlock 621 metadata and generate a request for the encryption key associated with index value 001 from the storage controller 320. Upon receiving an encryption key request, the storage controller 320 may access the encryption table and look up the particular encryption key using the index value 001 as a lookup key. Then the storage controller 320 may send the encryption key needed to decrypt CBlock 621 back to the DVAh 405.

Referring back to FIG. 5, after encrypting each of the CBlocks, step 570 depicts generating one or more clumps of encrypted CBlocks for storage. In an embodiment, clumps are configured to contain a specific number of CBlocks for storage. For example, encrypted CBlocks 621-624 may be organized within a single clump 630. In another example, encrypted CBlocks 621-624 may be organized into multiple clumps such that the first clump contains encrypted CBlocks 621 and 622 and the second clump contains encrypted CBlocks 623 and 624. In an embodiment, clumps may be configured to represent different lengths of contiguous data and therefore may be configured to contain a different number of CBlocks.

At step 575, clump fingerprints are generated for each clump. In an embodiment, clump fingerprints are based on the CBlock fingerprints generated at step 555. For example in FIG. 6, clump fingerprint 635 is generated using CBlock fingerprints 611-614 and packaged into the clump 630. In an embodiment, the clump fingerprint is computed as a fingerprint of the data block fingerprints associated with the CBlocks contained within the clump. The clump fingerprint may be computed as a combination of the data block fingerprints such that the clump fingerprint is a computed hash value that equals the hash value that would be computed if a hash value of the entire set of data blocks within the clump were to be computed. In other embodiments, the clump fingerprint may be computed using other combination techniques that combine property values from the data block fingerprints for CBlocks within the clump.

At step 580, the generated clumps that contain the encrypted CBlocks are sent to the storage controller 320 for storage in one or more storage nodes. In an embodiment, the DVAh 405 sends the generated clumps to the storage controller 320, which then determines which storage nodes to store the clumps. In an embodiment, the DVAh 405 may be configured to store the clumps within the cache 113 located within the host 100. For example the processing engine 520 is configured to send a copy of the generated clumps to sub-component cache manager 513. The cache manager 513, which is configured to perform reads and writes to the cache 113, writes the clumps to the cache 113.

At step 585, deduplication is performed on the clumps using the clump fingerprints as unique identifiers. In an embodiment, the storage controller 320 performs deduplication by comparing the clump fingerprints of the generated clumps to clump fingerprints stored in the fingerprint index 521. The fingerprint index 521 contains clump fingerprints of stored clumps. For example, the storage controller 320 performs deduplication on clump 630 by comparing clump fingerprint 635 to existing clump fingerprints within the fingerprint index 521. If clump fingerprint 635 matches an existing clump fingerprint in the fingerprint index 521, then clump 630 is already stored within the storage pool 300 and the storage controller 320 does not store clump 630 within a storage node. If however, clump fingerprint 635 does not match any of the fingerprints in the fingerprint index 521, then clump 630 is not currently stored within the storage pool 300 and the storage controller 320 stores clump 630 in one of the storage nodes. In an embodiment, deduplication may be performed during a space reclamation job. Space reclamation is described in detail in the RE-ENCRYPTING DATA USING SPACE RECLAMATION section herein.

In an embodiment, the DVAh 405 may perform deduplication of the generated clumps prior to storing the clumps in cache 113. For example, the processing engine 520 may be configured to communicate with the cache manager 513 to determine whether clump fingerprint 635 for clump 630 exists in the cache 113. If clump fingerprint 635 exists in cache 113, then clump 630 is not stored within cache 113. If however, clump fingerprint 635 does not exist in cache 113, then cache manager 513 stores clump 630 in cache 113.

Data Decryption

In an embodiment, when the DVAh 405 receives a read request to read encrypted data stored in either the storage pool 300 or cache 113, the DVAh 405 retrieves the appropriate encryption key from the storage controller 320 in order to decrypt and read the data requested. For example, if a read request to read data from CBlock 601 is received, the processing engine 520 locates the appropriate clump, clump 630, which contains CBlock 601. Since CBlock 601 has been compressed and encrypted to CBlock 621, the processing engine 520 reads the metadata associated with CBlock 621 to determine the encryption index value stored with CBlock 621. If the encryption index value is the same encryption index value currently used by the processing engine 520 to encrypt incoming write data, then the processing engine 520 may use the currently stored encryption key to decrypt CBlock 621. If however, the encryption index value from the CBlock 621 metadata is different from the encryption index value currently used by the processing engine 520, then the processing engine 520 generates and sends an encryption key request to the storage controller 320 to retrieve the encryption key needed to decrypt CBlock 621. Upon receiving an encryption key request from the processing engine 520, the storage controller 320 looks up the encryption key from the encryption table using the encryption index value and sends the encryption key and the encryption index value back to the processing engine 520. The processing engine 520 then uses the received encryption key to decrypt CBlock 621 and decompresses CBlock 621 to generate the uncompressed decrypted data stored in CBlock 601 for reading.

Encryption Key Rotation

For security purposes, encryption keys used by DVAh 405 to encrypt data may be periodically, or upon demand, updated. Periodically updating encryption keys prevent the threat of hackers decrypting encrypted data. Additionally, a security breach may prompt an update of encryption keys and trigger re-encrypting data.

In an embodiment, the encryption table contains multiple rows of encryption keys and encryption index values. To rotate the encryption key, the storage controller 320 is configured to generate a next encryption key and install it at the next row in the encryption table. If the storage controller 320 reaches the last row in the encryption table, the storage controller 320 is configured to wraparound and reuse the row at the beginning of the table. In an embodiment, the encryption table may be configured to update the value for an encryption key in the encryption table. If the value of an encryption key is updated for an encryption key and encryption index value pair, then all encrypted data using the old encryption key and encryption index value pair will need to be re-encrypted. For example, if the encryption table contains 100 rows of encryption key and encryption index value pairs and the storage controller 320 is currently using the encryption key and encryption index value in row number 100, then the storage controller 320 is configured to wrap around and use an encryption key and encryption index value pair in row number 1. If upon reuse of encryption key rows, the encryption table generates a new encryption key for row number 1, then the encrypted data, which was previously encrypted using the encryption key and encryption index value pair for row number 1 will be re-encrypted with the new value for the encryption key and encryption index value pair associated with row number 1.

In one embodiment, when a new encryption key is installed in the encryption table, the previously encrypted data is re-encrypted with the newly installed encryption key. In one embodiment, a row in the encryption table is not reused until all data encrypted with the encryption key associated with the row has been re-encrypted with another encryption key.

In an embodiment, the encryption table includes an encryption algorithm column associated with the encryption key and encryption index value pair for each row. The encryption algorithm describes an encryption method to encrypt data using the associated encryption key. The storage pool 300 may be configured to support more than one encryption algorithm at one time. For example, if during encryption key rotation the newly assigned encryption key is associated with a different encryption method, then the storage controller 320 is configured to re-encrypt all the data stored in the storage pool 300 and cache 113 with the new encryption key and new encryption algorithm. Re-encrypting data stored within the storage pool 300 and within cache 113 on host 100 require first decrypting the encrypted data and then re-encrypting the data using the new encryption key and encryption method.

Re-Encrypting Data Using Space Reclamation

The process of re-encrypting data stored within the storage pool 300 and within cache 113 on host 100 may be accomplished using space reclamation. Space reclamation is a process of reclaiming storage space currently occupied by stored data that is no longer accessible. During space reclamation, data that is still being used is copied forward to new storage regions. During the copy-forward phase, data may be decrypted and then re-encrypted using the new encryption key.

In an embodiment, a file system within the storage pool 300 manages how data is organized within the storage pool 300. For example, the file system may organize data as a log-structured file system within the storage pool 300. A log structured file system is a file system where data is sequentially written to one or more data logs. Each data log may include specific storage regions, herein referred to as containers. A container may store multiple clumps based upon the configured size of the container. As discussed, the storage controller 320 receives write requests to store clumps within containers in the storage nodes.

Over the course of time objects stored in the file system are updated and deleted, the file system accumulates clumps that contain data that is no longer used by any software application (referred to herein as "dead data"). A clump that contains dead data is referred to herein as a "dead clump". For example, assume that an object O is initially stored on clumps A, B and C. If object O is updated, the updated version of object O may be written out to clumps X, Y and Z. In response to the update, the metadata that maps object O to clumps A, B and C is deleted, and metadata that maps object O to clumps X, Y and Z is created. Assuming that no other object is mapped to clumps A, B and C, clumps A, B and C will be dead after the update. That is, the data on clumps A, B and C is no longer in use by any software application. Space reclamation is a process by which storage regions occupied by dead clumps are reclaimed so that the clumps may be reused to store new "live" data. During space reclamation, live clumps within an existing container are copied to a new container so that the previous container, which may have included both live and dead clumps can be made available for reuse. The process of moving the live clumps from an existing container to a new container is referred to as a copy-forward operation.

In an embodiment, space reclamation may be accomplished using a space reclamation job that reclaims storage space from existing containers by moving live clumps to new containers created within a data log. The storage controller 320 may include a software layer called the job controller, which is configured to coordinate the multiple steps in the space reclamation job. In another embodiment, the job controller may be implemented on a separate server communicatively coupled to the storage pool 300. The job controller is configured to delegate different space reclamation tasks to one or more task workers. Task workers represent processes or threads, which may run in parallel, implemented on specific storage nodes within the storage pool 130. Task workers located on specific storage nodes receive tasks related to clumps stored within their corresponding storage node. In another embodiment, task workers may represent processes or threads implemented on the hosts 100.

The job controller is configured to determine when to schedule a space reclamation job, how to partition data into multiple tasks to delegate to available task workers, and manage status of task workers to determine which task workers are available for specific tasks. In an embodiment, the job controller may determine to initiate the space reclamation job based upon currently available storage space within the storage pool or based upon the need to update encryption keys and/or encryption methods on stored clumps. For example, new encryption keys may need to be sent to hosts and encrypted data using old encryption keys may need to be re-encrypted.

The space reclamation job may involve multiple phases that implement the techniques of mark-and-sweep and copy-forward to identify and move live clumps to new containers. Mark-and-sweep is an approach that involves (a) identifying the objects that are currently "live" or "reachable" by software entities, (b) marking the clumps that store data for those objects as "live", and then (c) freeing up all clumps that are not marked as "live". In an embodiment, the job controller is configured to delegate the following mark-and-sweep tasks to task workers: (1) identifying live objects using file system metadata, (2) identifying the live clumps as clumps that contain the live objects based on object-to-clump mapping, and (3) determining containers that contain the identified live clumps using the fingerprint index 521.

Upon determining the containers that contain live clumps, the job controller is configured to delegate to task workers a subset of container IDs from which live clumps are to be copied-forward to new containers. In an embodiment, each of the task workers receives a subset of container IDs and iterates through each container and performs copy-forward operations on the live clumps within each container.

In an embodiment, the task workers are configured to determine the encryption index value stored within each CBlock within the live clumps for a particular container. For example, if a particular live clump is clump 630, then the task workers will read the metadata associated with the CBlocks within clump 630 to determine the encryption index value used to encrypt the data within CBlocks 621-624. In an embodiment, the task workers may be configured to send an encryption key request to the storage controller 320 to retrieve the needed encryption keys to decrypt the CBlocks. Upon receiving the encryption keys from the storage controller 320, the task workers then decrypt the CBlocks using the received encryption keys. In one embodiment, the task workers may cache the received encryption keys and use them for decrypting CBlocks in subsequent live clumps.

In one embodiment, the storage controller 320 may be configured to send the current encryption key and encryption index value to the task worker when the job controller initially sends the subset of container IDs for copying-forward. The task workers are configured to re-encrypt the CBlocks using the current encryption key. After the CBlocks are encrypted, new clumps are generated for the encrypted CBlocks and the new clumps are stored within the new containers as part of the copy-forward process.

Re-Encrypting Data within Cache

Encrypted data stored within cache 113 may also be re-encrypted as part of space reclamation. The job controller may be configured to delegate to task workers the job of reclaiming storage space by removing dead clumps within cache 113 and re-encrypting live clumps stored in the cache 113. In an embodiment, one or more task workers may be implemented as processes within the processing engine 520. The task workers may be configured to walk through the clumps stored within the cache 113 and identify the live clumps. The task workers then determine the encryption key index values associated with the CBlocks in the identified live clumps. In an embodiment, the task workers may be configured to send an encryption key request to the storage controller 320 to retrieve the needed encryption keys to decrypt the CBlocks. Upon receiving the encryption keys from the storage controller 320, the task workers then decrypt the CBlocks using the received encryption keys. In one embodiment, the task workers may cache the received encryption keys and use them for decrypting CBlocks in subsequent live clumps.

The task workers then re-encrypt the CBlocks using the current encryption key received from the storage controller 320. In one embodiment, the storage controller 320 may be configured to send the current encryption key and encryption index value to the task worker when the job controller initially delegates the jobs of reclaiming storage space. After the CBlocks are encrypted, new clumps are generated for the encrypted CBlocks and the new clumps are stored in the cache 113.

In another embodiment, the task of re-encrypting data stored within cache 113 may be a standalone process initiated by either the DVAh 405 within host 100, the storage controller 320, or manually by a user or a system administrator.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
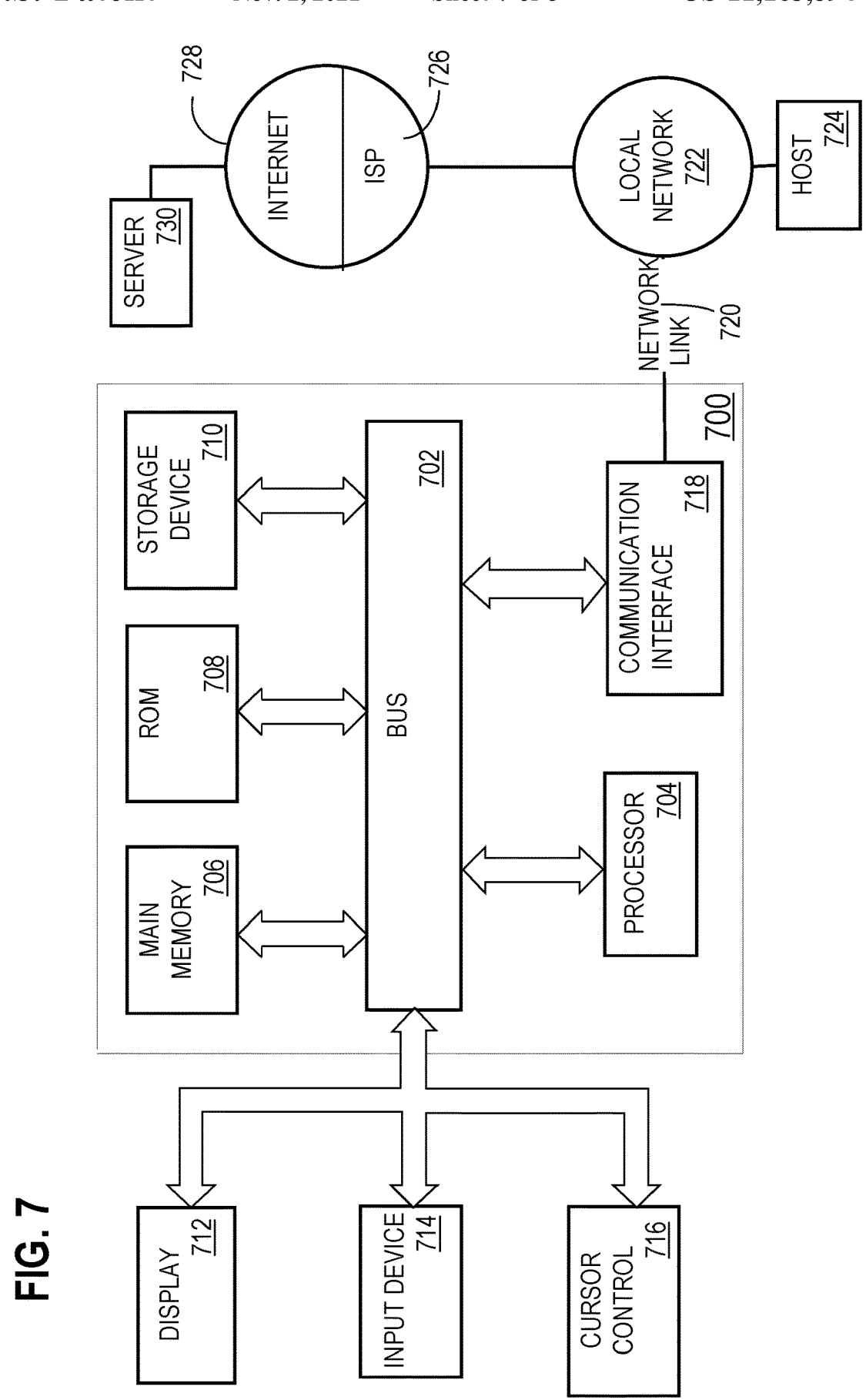
FIG. 7 is a block diagram that depicts an example computer system upon which embodiments may be implemented.

For example, FIG. 7 is a block diagram that illustrates a computer system 700 upon which an embodiment may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for packaging encrypted data in a storage system comprising:
   receiving, by a host-side module executing on a host machine, a data storage write request for particular data to be written, wherein the particular data has been encrypted and has one or more associated fingerprints based on an unencrypted version of the particular data;
   packaging, by the host-side module, the particular data into one or more clumps;
   generating, by the host-side module, one or more clump fingerprints based on the one or more associated fingerprints; and
   sending the one or more clumps to a storage node; and
   in response to a request for data that resides in a particular clump of the one or more clumps, locating the particular clump based, at least in part, on the one or more clump fingerprints.

2. The method of claim 1, wherein the particular data that has been encrypted comprises metadata containing an encryption key index value, wherein the encryption key index value represents an identifier used to identify an associated encryption key from an encryption table maintained by the storage system.

3. The method of claim 2, further comprising:
   receiving, at the host-side module, a request to re-encrypt data within clumps stored within a cache located on the host machine;
   identifying, by the host-side module, a set of clumps to be re-encrypted by reading the clumps stored within the cache;
   determining, by the host-side module, a set of one or more encryption key index values, which represent identifiers used to identify the encryption keys needed to decrypt data within the set of clumps, from metadata associated within the clumps;
   identifying, by the host-side module, a set of one or more encryption keys associated with the determined set of one or more encryption key index values based on the encryption table maintained by the storage system;
   generating, by the host-side module, decrypted data from the set of clumps by decrypting the encrypted data using the identified set of one or more encryption keys;
   generating, by the host-side module, encrypted data by encrypting the decrypted data using a new encryption key;
   packaging, by the host-side module, the encrypted data into a set of clumps;
   storing the set of clumps to the cache.

4. The method of claim 2, further comprising:
   receiving, at the one or more storage nodes separate from the host machine, a request to re-encrypt data within clumps stored on the one or more storage nodes;
   identifying, by a task worker executing on the one or more storage nodes, a set of clumps to be re-encrypted by reading the clumps stored on the one or more storage nodes;
   determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the one or more storage nodes.

5. The method of claim 2, further comprising:

receiving, at the storage node separate from the host machine, a request to re-encrypt data within clumps stored on the storage node;

identifying, by a task worker executing on the storage node, a set of clumps to be re- encrypted by reading the clumps stored on the storage node;

determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the storage node.

6. The method of claim 1, wherein receiving the data storage write request comprises:

receiving, by the host-side module, the data storage write request for unencrypted data;

generating, by the host-side module, the one or more associated fingerprints based on the unencrypted data; and encrypting, by the host-side module, the unencrypted data to generate the particular data to be written.

7. The method of claim 6, further comprising prior to encrypting the unencrypted data to generate the particular data, performing compression on the unencrypted data.

8. The method of claim 6, wherein encrypting the unencrypted data to generate the particular data to be written, comprises:

requesting, from the storage system, an encryption key to be used to encrypt the unencrypted data;

receiving, from the storage system, the encryption key and an associated encryption key index value, wherein the associated encryption key index value is an identifier used to identify the encryption key from an encryption table maintained by the storage system; and generating, by the host-side module, the particular data by encrypting the unencrypted data using the encryption key.

9. The method of claim 1, further comprising prior to packaging the particular data into the one or more clumps, performing, by the host-side module, deduplication of the particular data based on the one or more associated fingerprints.

10. The method of claim 9, wherein the host-side module manages a cache of encrypted blocks within the host machine, and performing deduplication is performed by the host-side module comparing the one or more fingerprints to fingerprints of blocks stored in the cache.

11. A non-transitory computer-readable medium that stores instructions for encrypting data in a storage system which, when executed by one or more processors, cause performance of:

receiving, by a host-side module executing on a host machine, a data storage write request for particular data to be written, wherein the particular data has been encrypted and has one or more associated fingerprints based on an unencrypted version of the particular data;

packaging, by the host-side module, the particular data into one or more clumps;

generating, by the host-side module, one or more clump fingerprints based on the one or more associated fingerprints; and sending the one or more clumps to a storage node; and in response to a request for data that resides in a particular clump of the one or more clumps, locating the particular clump based, at least in part, on the one or more clump fingerprints.

12. The non-transitory computer-readable medium of claim 11, wherein the particular data that has been encrypted comprises metadata containing an encryption key index value, wherein the encryption key index value represents an identifier used to identify an associated encryption key from an encryption table maintained by the storage system.

13. The non-transitory computer-readable medium of claim 12, further comprising instructions which, when executed by the one or more processors, cause performance of:

receiving, at the host-side module, a request to re-encrypt data within clumps stored within a cache located on the host machine;

identifying, by the host-side module, a set of clumps to be re-encrypted by reading the clumps stored within the cache;

determining, by the host-side module, a set of one or more encryption key index values, which represent identifiers used to identify the encryption keys needed to decrypt data within the set of clumps, from metadata associated within the clumps;

identifying, by the host-side module, a set of one or more encryption keys associated with the determined set of one or more encryption key index values based on the encryption table maintained by the storage system;

generating, by the host-side module, decrypted data from the set of clumps by decrypting the encrypted data using the identified set of one or more encryption keys;

generating, by the host-side module, encrypted data by encrypting the decrypted data using a new encryption key;

packaging, by the host-side module, the encrypted data into a set of clumps;

storing the set of clumps to the cache.

14. The non-transitory computer-readable medium of claim 12, further comprising instructions which, when executed by the one or more processors, cause performance of:

receiving, at the one or more storage nodes separate from the host machine, a request to re-encrypt data within clumps stored on the one or more storage nodes;

identifying, by a task worker executing on the one or more storage nodes, a set of clumps to be re-encrypted by reading the clumps stored on the one or more storage nodes;

determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the one or more storage nodes.

15. The non-transitory computer-readable medium of claim 12, further comprising instructions which, when executed by the one or more processors, cause performance of:

receiving, at the storage node separate from the host machine, a request to re-encrypt data within clumps stored on the storage node;

identifying, by a task worker executing on the storage node, a set of clumps to be re- encrypted by reading the clumps stored on the storage node;

determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the storage node.

16. The non-transitory computer-readable medium of claim 11, wherein receiving the data storage write request comprises:

receiving, by the host-side module, the data storage write request for unencrypted data;

generating, by the host-side module, the one or more associated fingerprints based on the unencrypted data; and encrypting, by the host-side module, the unencrypted data to generate the particular data to be written.

17. The non-transitory computer-readable medium of claim 16, further comprising instructions which, when executed by the one or more processors, cause performance of prior to encrypting the unencrypted data to generate the particular data, performing compression on the unencrypted data.

18. The non-transitory computer-readable medium of claim 16, wherein encrypting the unencrypted data to generate the particular data to be written, comprises:

requesting, from the storage system, an encryption key to be used to encrypt the unencrypted data;

receiving, from the storage system, the encryption key and an associated encryption key index value, wherein the associated encryption key index value is an identifier used to identify the encryption key from an encryption table maintained by the storage system; and generating, by the host-side module, the particular data by encrypting the unencrypted data using the encryption key.

19. The non-transitory computer-readable medium of claim 11, further comprising instructions which, when executed by the one or more processors, cause performance of prior to packaging the particular data into the one or more clumps, performing, by the host-side module, deduplication of the particular data based on the one or more associated fingerprints.

20. The non-transitory computer-readable medium of claim 19, wherein the host-side module manages a cache of encrypted blocks within the host machine, and performing deduplication is performed by the host-side module comparing the one or more fingerprints to fingerprints of blocks stored in the cache.

21. A system comprising:

one or more computers having one or more processors and one or more storage media storing instructions, for encrypting data in a storage system, that when executed by the one or more processors causes the one or more computers to perform operations comprising:

receiving, by a host-side module executing on a host machine, a data storage write request for particular data to be written, wherein the particular data has been encrypted and has one or more associated fingerprints based on an unencrypted version of the particular data;

packaging, by the host-side module, the particular data into one or more clumps;

generating, by the host-side module, one or more clump fingerprints based on the one or more associated fingerprints; and sending the one or more clumps to a storage node; and in response to a request for data that resides in a particular clump of the one or more clumps, locating the particular clump based, at least in part, on the one or more clump fingerprints.

22. The system of claim 21, wherein the particular data that has been encrypted comprises metadata containing an encryption key index value, wherein the encryption key index value represents an identifier used to identify an associated encryption key from an encryption table maintained by the storage system.

23. The system of claim 22, further comprising:

receiving, at the host-side module, a request to re-encrypt data within clumps stored within a cache located on the host machine;

identifying, by the host-side module, a set of clumps to be re-encrypted by reading the clumps stored within the cache;

determining, by the host-side module, a set of one or more encryption key index values, which represent identifiers used to identify the encryption keys needed to decrypt data within the set of clumps, from metadata associated within the clumps;

identifying, by the host-side module, a set of one or more encryption keys associated with the determined set of one or more encryption key index values based on the encryption table maintained by the storage system;

generating, by the host-side module, decrypted data from the set of clumps by decrypting the encrypted data using the identified set of one or more encryption keys;

generating, by the host-side module, encrypted data by encrypting the decrypted data using a new encryption key;

packaging, by the host-side module, the encrypted data into a set of clumps;

storing the set of clumps to the cache.

24. The system of claim 22, further comprising:

receiving, at the one or more storage nodes separate from the host machine, a request to re-encrypt data within clumps stored on the one or more storage nodes;

identifying, by a task worker executing on the one or more storage nodes, a set of clumps to be re-encrypted by reading the clumps stored on the one or more storage nodes;

determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the one or more storage nodes.

25. The system of claim 22, further comprising:

receiving, at the storage node separate from the host machine, a request to re-encrypt data within clumps stored on the storage node;

identifying, by a task worker executing on the storage node, a set of clumps to be re-encrypted by reading the clumps stored on the storage node;

determining, by the task worker, a set of one or more encryption key index values, which represent identifiers used to identify the encryption keys needed to decrypt data within the set of clumps, from metadata associated within the clumps;

identifying, by the task worker, an encryption key associated with the determined set of one or more encryption key index values based on the encryption table maintained by the storage system;

generating, by the task worker, decrypted data from the set of clumps by decrypting the encrypted data using the identified set of one or more encryption keys;

generating, by the task worker, encrypted data by encrypting the decrypted data using a new encryption key;

packaging, by the task worker, the encrypted data into a set of clumps;

storing the set of clumps within the storage node.

26. The system of claim 21, wherein receiving the data storage write request comprises:

receiving, by the host-side module, the data storage write request for unencrypted data;

generating, by the host-side module, the one or more associated fingerprints based on the unencrypted data; and encrypting, by the host-side module, the unencrypted data to generate the particular data to be written.

27. The system of claim 26, further comprising prior to encrypting the unencrypted data to generate the particular data, performing compression on the unencrypted data.

28. The system of claim 26, wherein encrypting the unencrypted data to generate the particular data to be written, comprises:

requesting, from the storage system, an encryption key to be used to encrypt the unencrypted data;

receiving, from the storage system, the encryption key and an associated encryption key index value, wherein the associated encryption key index value is an identifier used to identify the encryption key from an encryption table maintained by the storage system; and generating, by the host-side module, the particular data by encrypting the unencrypted data using the encryption key.

29. The system of claim 21, further comprising prior to packaging the particular data into the one or more clumps, performing, by the host-side module, deduplication of the particular data based on the one or more associated fingerprints.

30. The system of claim 29, wherein the host-side module manages a cache of encrypted blocks within the host machine, and performing deduplication is performed by the host-side module comparing the one or more fingerprints to fingerprints of blocks stored in the cache.

* * * * *